US008844132B2

(12) United States Patent
Blais et al.

(10) Patent No.: US 8,844,132 B2
(45) Date of Patent: Sep. 30, 2014

(54) METHOD OF MACHINING USING AN AUTOMATIC TOOL PATH GENERATOR ADAPTED TO INDIVIDUAL BLADE SURFACES ON AN INTEGRALLY BLADED ROTOR

(75) Inventors: Mario Blais, Varennes (CA); Michel Bellerose, Ste-Julie (CA)

(73) Assignee: Pratt & Whitney Canada Corp., Longueuil, Quebec (CA)

( * ) Notice: Subject to any disclaimer, the term of this patent is extended or adjusted under 35 U.S.C. 154(b) by 570 days.

(21) Appl. No.: 13/188,570

(22) Filed: Jul. 22, 2011

(65) Prior Publication Data

US 2013/0019477 A1    Jan. 24, 2013

(51) Int. Cl.
| | | |
|---|---|---|
| B23B 35/00 | (2006.01) | |
| B23C 3/00 | (2006.01) | |
| B23P 15/02 | (2006.01) | |
| B23C 3/18 | (2006.01) | |

(52) U.S. Cl.
CPC ............... B23C 3/18 (2013.01); *B23C 2215/44* (2013.01)
USPC .......... 29/889.23; 29/557; 29/889.7; 408/1 R; 409/132; 700/61; 700/98; 700/118; 700/160

(58) Field of Classification Search
USPC ............... 29/557, 558, 889.1, 889.23, 889.7; 700/61, 98, 105, 118, 160, 163, 190, 700/193; 408/1 R; 409/80, 132
See application file for complete search history.

(56) References Cited

U.S. PATENT DOCUMENTS

| | | | |
|---|---|---|---|
| 3,890,062 | A | 6/1975 | Hendrix et al. |
| 4,382,215 | A * | 5/1983 | Barlow et al. ............... 318/568.1 |
| 4,951,217 | A | 8/1990 | Clack et al. |
| 5,021,941 | A | 6/1991 | Ford et al. |
| 5,282,261 | A | 1/1994 | Skeirik |
| 5,285,572 | A | 2/1994 | Rathi et al. |
| 5,286,947 | A | 2/1994 | Clyde et al. |
| 5,288,209 | A | 2/1994 | Therrien et al. |
| 5,369,870 | A | 12/1994 | Ouchi et al. |
| 5,428,201 | A | 6/1995 | Kaneko et al. |
| 5,523,953 | A | 6/1996 | Araie et al. |
| 5,571,426 | A | 11/1996 | Akemura |
| 5,649,063 | A | 7/1997 | Bose |
| 5,664,066 | A | 9/1997 | Sun et al. |
| 5,831,407 | A | 11/1998 | Ouchi et al. |
| 6,340,424 | B1 * | 1/2002 | Elman et al. .................. 205/645 |
| 6,453,211 | B1 | 9/2002 | Randolph, Jr. et al. |
| 6,471,474 | B1 | 10/2002 | Mielke et al. |
| 6,478,539 | B1 | 11/2002 | Trutschel |
| 6,524,070 | B1 | 2/2003 | Carter |
| 6,676,344 | B1 | 1/2004 | Amatt |
| 6,850,814 | B2 | 2/2005 | Kamiya |
| 6,850,874 | B1 | 2/2005 | Higuerey et al. |

(Continued)

FOREIGN PATENT DOCUMENTS

| | | |
|---|---|---|
| WO | 93/23820 | 11/1993 |
| WO | 2009/106830 | 9/2009 |

*Primary Examiner* — Alexander P Taousakis
(74) *Attorney, Agent, or Firm* — Norton Rose Fulbright Canada LLP

(57) ABSTRACT

A method of flank and/or point milling an integrally bladed rotor is conducted with an automatic tool path generator which generates a new created tool path including smooth transitions merging between an actual finished surface and a nominal surface of the integrally bladed rotor. The actual finished surface is presented in a mathematical transformation matrix which may be obtained in a 3-D scanning process.

12 Claims, 3 Drawing Sheets

(56) References Cited

U.S. PATENT DOCUMENTS

| | | |
|---|---|---|
| 6,905,310 B2 | 6/2005 | Kawamoto et al. |
| 6,905,312 B2 * | 6/2005 | Bourgy et al. ................ 416/234 |
| 6,912,446 B2 | 6/2005 | Wang et al. |
| 7,099,737 B2 | 8/2006 | Suh et al. |
| 7,366,583 B2 | 4/2008 | Burgess et al. |
| 7,377,037 B2 | 5/2008 | Ouellette et al. |
| 7,472,478 B2 | 1/2009 | Graham et al. |
| 7,513,027 B2 | 4/2009 | Boehm et al. |
| 7,559,728 B2 | 7/2009 | Meier et al. |
| 7,634,854 B2 | 12/2009 | Meier |
| 7,637,010 B2 | 12/2009 | Burgess et al. |
| 7,704,021 B2 | 4/2010 | Hollmann et al. |
| 7,797,828 B2 * | 9/2010 | Beeson et al. ........... 29/888.021 |
| 7,877,162 B2 * | 1/2011 | Glaesser et al. .............. 700/160 |
| 7,992,761 B2 | 8/2011 | Baumann et al. |
| 8,100,655 B2 | 1/2012 | Stone et al. |
| 8,103,375 B2 | 1/2012 | Ouellette et al. |
| 8,171,632 B2 * | 5/2012 | Kuehhorn et al. ......... 29/889.23 |
| 8,578,579 B2 * | 11/2013 | Rangarajan et al. ....... 29/402.01 |
| 8,597,073 B2 * | 12/2013 | Derrien et al. .................... 451/5 |
| 8,615,317 B2 * | 12/2013 | Neumaier et al. .............. 700/97 |
| 2001/0000805 A1 * | 5/2001 | Kadono ...................... 700/182 |
| 2002/0164221 A1 * | 11/2002 | Izutsu et al. .................. 409/132 |
| 2004/0024472 A1 * | 2/2004 | Evans et al. ...................... 700/2 |
| 2005/0004684 A1 | 1/2005 | Cribbs |
| 2007/0124933 A1 * | 6/2007 | Burgess et al. .............. 29/889.7 |
| 2008/0105094 A1 | 5/2008 | McMurtry et al. |
| 2008/0250659 A1 | 10/2008 | Bellerose et al. |
| 2009/0282680 A1 | 11/2009 | Kappmeyer et al. |
| 2010/0023157 A1 | 1/2010 | Burgess et al. |
| 2011/0180521 A1 | 7/2011 | Quitter et al. |
| 2012/0124834 A1 * | 5/2012 | Cholet et al. ................ 29/889.7 |
| 2012/0138586 A1 | 6/2012 | Webster et al. |

* cited by examiner

METHOD OF MACHINING USING AN AUTOMATIC TOOL PATH GENERATOR ADAPTED TO INDIVIDUAL BLADE SURFACES ON AN INTEGRALLY BLADED ROTOR

TECHNICAL FIELD

The described subject matter relates generally to compensation for process variables in a numerically-controlled machining operation, and more particularly to an improved method of machining an integrally bladed rotor using an automatic tool path generator adapted to individual blade surfaces on the integrally bladed rotor.

BACKGROUND OF THE ART

An integrally bladed rotor for gas turbine engines has a plurality of blades with airfoil surfaces radially extending from a disc. The process of joining the individual blades to the disc can result in a mismatch between, for example a top blade portion and a bottom portion which is part of the disc. This mismatch on each blade and root block (which is used to hold the blade during the joining process) must be machined out. However, the tool path designed for this machining operation is defined in a nominal mode, provided for example in a CAD (Computer Aided Design) file. Use of the nominal tool path to direct machining of the integrally bladed rotor with mismatched finished blades, may result in damage to the blades of integrally bladed rotor because differences exist between the nominal profile and an actual profile of the respective blades due to fabrication tolerances and positioning tolerances of the blades. In the prior art, damage is prevented by measuring each individual blade at the joining process and then manually correcting the nominal tool path for machining of each blade. This requires a considerable amount of time and effort sending the part for measurement then re-programming to suit the actual profile of each blade. Furthermore, the conventional measurement method is limited to determining a small number of points along a single line of the actual blade surface at the time of the joining process, for example through touch probing. The adjustment of the nominal tool path is conducted along this line of measured points. However, blades are in a twisting configuration and many lines of points must be measured in order to optimize the tool path for removal of a minimal amount of material after the joining process.

Accordingly, there is a need to provide an improved method of machining an integrally bladed rotor.

SUMMARY

In one aspect, the described subject matter provides a method of milling an integrally bladed rotor having a plurality of blades radially extending from a disc, the method comprising a) measuring the integrally bladed rotor and obtaining a 3-D mathematical transformation matrix of each finished surface of the integrally bladed rotor; b) using the 3-D mathematical transformation matrix of the respective finished surfaces, a nominal computer aided design (CAD) model of respective surfaces of the integrally bladed rotor and nominal tool paths designed for the nominal CAD model of the respective surfaces, as calculation inputs to generate a new created tool path program, the new created tool path program including tool path transitions smoothly merging from the nominal CAD model of the respective surfaces to the 3-D mathematical transformation matrix of the respective finished surfaces, and the new created tool path program being defined taking into consideration positions and orientations of a milling cutter having a selected geometry when controlled by the new created tool path program in a flank and point milling operation in order to prevent the milling cutter from interfering with blades adjacent a blade being currently machined; and c) milling the integrally bladed rotor by using the milling cutter according to the new created tool path program in order to generate new finished surfaces of the integrally bladed rotor.

In another aspect, the described subject matter provides a method of milling an integrally bladed rotor having a plurality of blades radially extending from a disc, the method comprising a) measuring the integrally bladed rotor and obtaining a 3-D mathematical transformation matrix of each finished surface of the integrally bladed rotor; b) using the 3-D mathematical transformation matrix of the respective finished surfaces, a nominal computer aided design (CAD) model of respective surfaces of the integrally bladed rotor and nominal tool paths designed for the nominal CAD model of the respective surfaces, as calculation inputs to generate a new created tool path program, the new created tool path program including tool path transitions smoothly merging from the nominal CAD model of the respective surfaces to the 3-D mathematical transformation matrix of the respective finished surfaces, and the new created tool path program being defined taking into consideration positions and orientations of a milling cutter having a selected geometry when controlled by the new created tool path program in a flank and point milling operation in order to prevent the milling cutter from interfering with blades adjacent a blade being currently machined; and c) milling the integrally bladed rotor by using the milling cutter according to the new created tool path program in order to generate new finished surfaces of the integrally bladed rotor.

Further details of these and other aspects of the described subject matter will be apparent from the detailed description and drawings included below.

BRIEF DESCRIPTION OF THE DRAWINGS

Reference is now made to the accompanying drawings depicting aspects of the described subject matter, in which.

DETAILED DESCRIPTION

Figure 1:
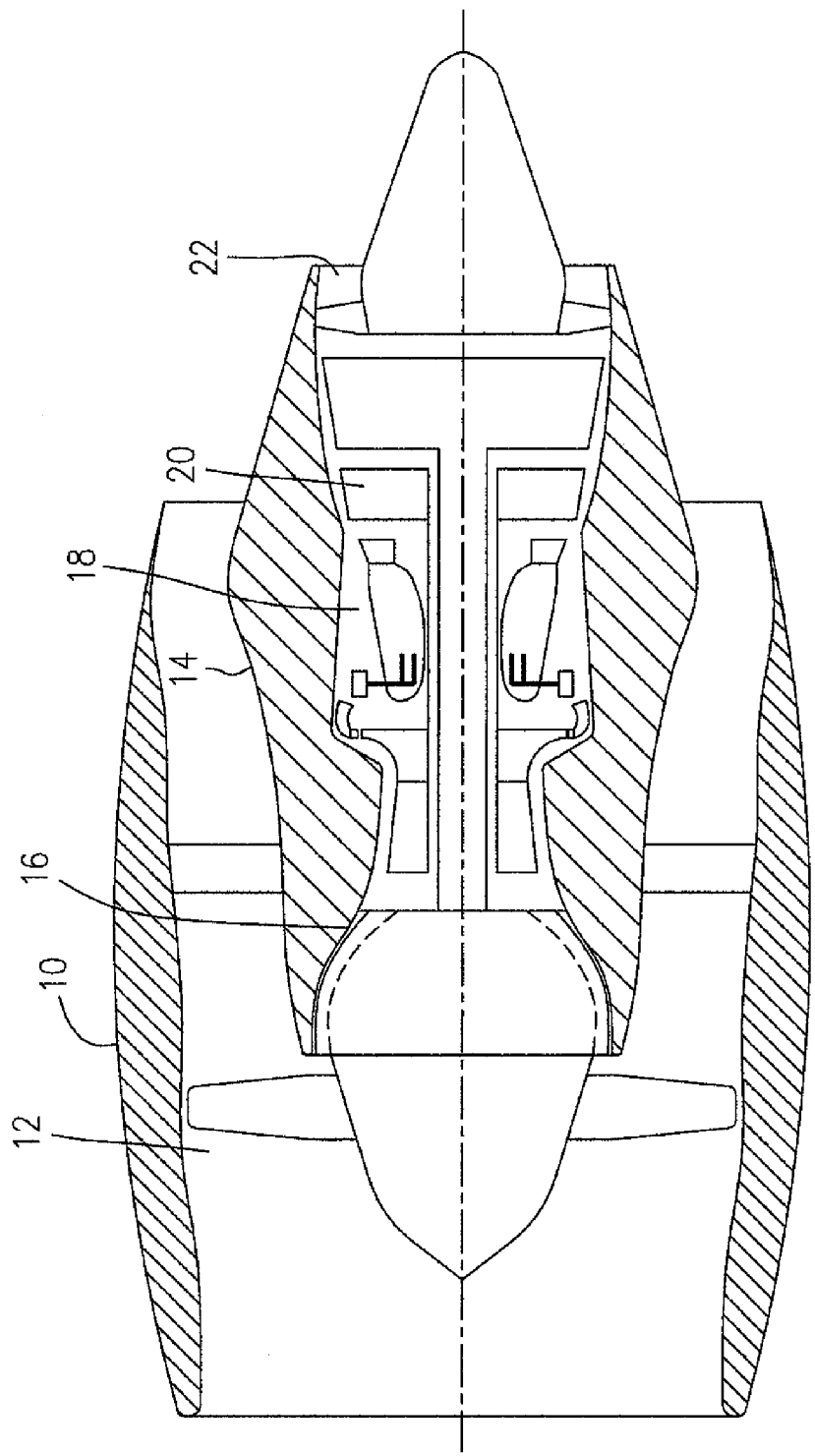
FIG. 1 is a schematic cross-sectional view of a turbofan gas turbine engine showing an exemplary application of the described subject matter.

Referring to FIG. 1, a turbofan gas turbine engine presented as an example of the application of the described subject matter, includes a housing or nacelle 10 which contains a fan section 12 and at least a major section of core casing 14, the core casing 14 comprising in flow series, a compressor section 16 and combustion section 18, a turbine section 20 and an exhaust section 22. The turbine section 20 and the compressor section 16 may comprise multiple stages, each including a rotor having a plurality of blades radially extending from a disc, as further described below.

Figure 2:
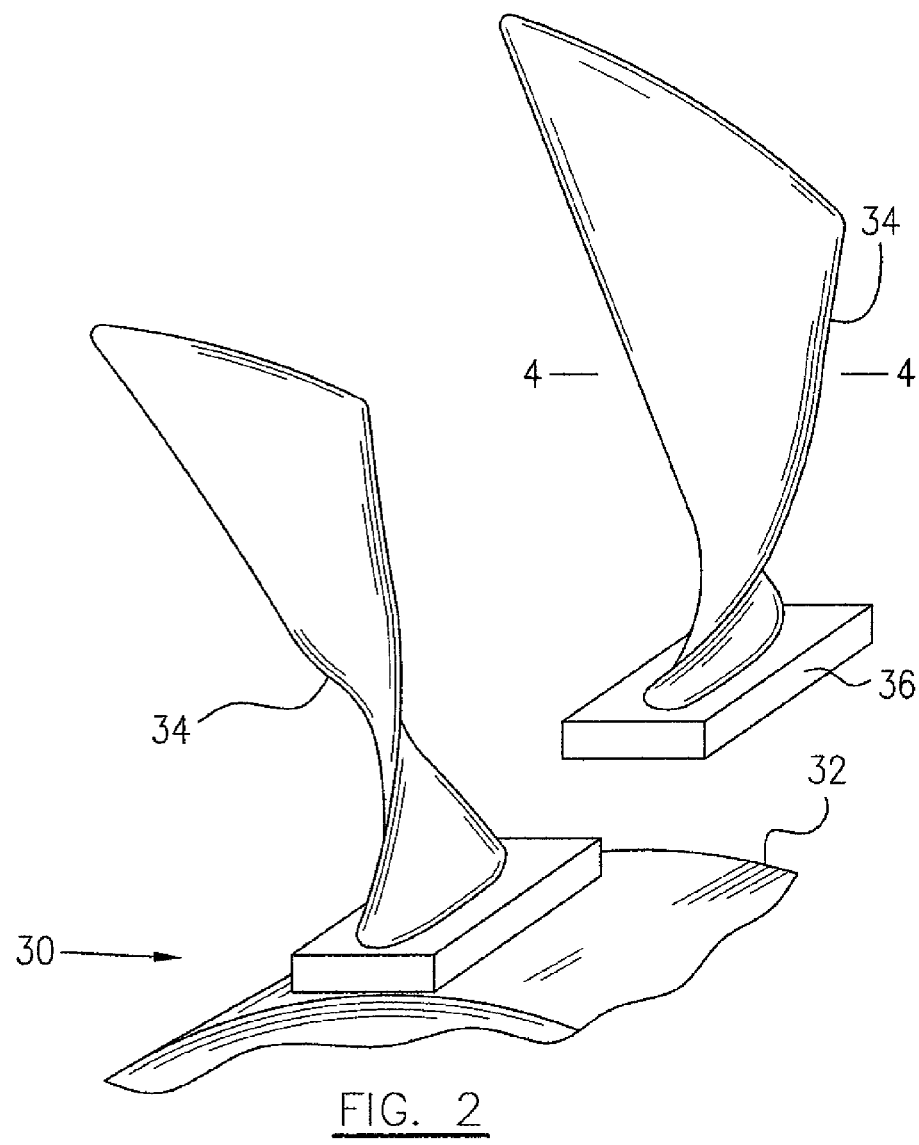
FIG. 2 is perspective view of an integrally bladed rotor used in the engine of FIG. 1, showing the integrally bladed rotor in a joining process (only two blades are shown)

Referring to FIGS. 1-4, the rotor used in the compressor section 16 including either a fan rotor or compressor rotor and in the turbine section 20 including for example a turbine rotor, may be fabricated as an integrally bladed rotor 30 which includes a disc 32 with an array of blades 34 affixed to the periphery of the disc 32 (only part of the disc 32 and two blades 34 are shown in FIG. 2). The blades 34 extend radially outwardly from the disc 32 and are circumferentially spaced apart one from another. The disc 32 and the individual blades 34 according to one embodiment, are fabricated individually and the individual blades 34 are attached to the periphery of the disc for example in a welding process. As shown in FIG. 2, one of the blades 34 is positioned on the periphery of the disc 34 and another one of the blades 34 is about to be placed during the welding procedure such as linear friction welding, which is applied along a joint area between the individual blades 34 and the disc 32, thereby forming the integrally bladed rotor 30.

Each blade 34 includes a root block 36 affixed to the bottom of the blade 34 for holding the blade 34 on the disc 32 during the welding procedure. The root block 36 must be machined out to form a bottom portion of the blade 34 after the welding procedure. It is also possible to cause mismatch between the top blade portion and the blade bottom which is part of the disc 32, during the welding procedure. This mismatch must also be machined out in the machining operation after the welding procedure. This machining operation may be conducted by a numerically-controlled (N/C) machine tool, for example in a flank and/or point milling operation in which the tool such as a milling cutter 38 may follow a nominal tool path, for example as defined in a Computer Aided Design (CAD) file in the milling operation, to machine out the mismatch of the blade 34 and the root block 36, thereby forming the integrally bladed rotor 30.

Figure 4:
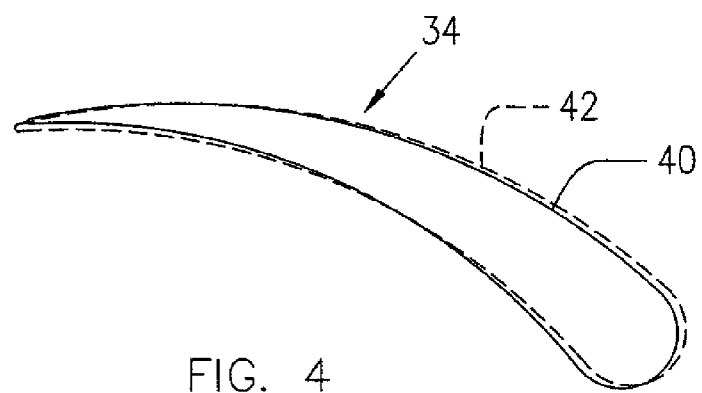
FIG. 4 is a schematic illustration of a cross-sectional view of a rotor blade taken along line 4-4 in FIG. 2, showing an exaggerated difference between a nominal profile and an actual profile of the blade
Figure 3:
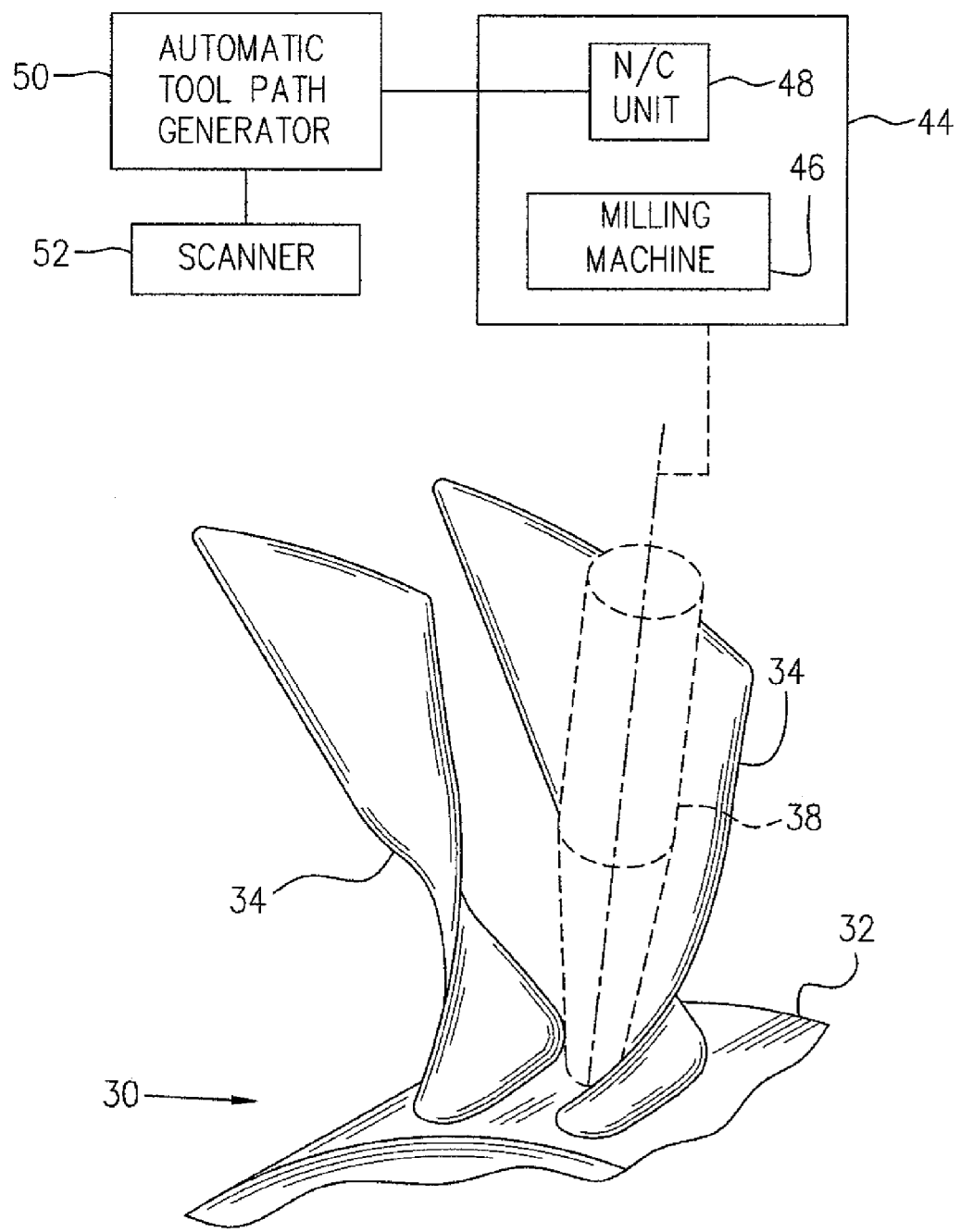
FIG. 3 is perspective view of the integrally bladed rotor of FIG. 2, showing the integrally bladed rotor in a machining process.

The nominal tool path is calculated and generated based on a nominal profile of the integrally bladed rotor 30, which is also defined in a nominal model provided for example in a CAD file. The nominal profiles of the respective blades 34 are identical. However, differences between the nominal profile as shown in FIG. 4, as solid lines 40 and the actual profile show as broken lines 42, may exist due to acceptable fabrication tolerances in the previous fabrication procedures of the respective parts of the integrally bladed rotor 30 and acceptable positioning tolerances during the welding procedure. After the welding procedure, if the machining operation follows the nominal tool path without correction or modification, the respective parts of the integrally bladed rotor 30 may be damaged due to the differences between the nominal profile and the actual profile of the blades of the integrally bladed rotor 30.

Therefore, a computer system functioning as an automatic tool path generator 50 according to one embodiment, is used with a N/C machine tool 44 to allow the N/C machine tool 44 to perform the machining operation such as the flank and/or point milling operation, following new created tool paths. The automatic tool path generator 50 may be a separate computer system linked to a N/C unit 48 of the machine tool 44 which controls a milling machine 46 of the machine tool 44. Alternatively, the automatic tool path generator 50 may be a software included in the N/C unit 48.

After the joining procedure as illustrated in FIG. 2, the integrally bladed rotor 30 is measured, for example by a 3-D scanner 52, in order to calculate a 3-D mathematical transformation matrix of each finished surface of the integrally bladed rotor 30, such as the finished surfaces (not numbered) at the suction side, pressure side, leading edge and trailing edge of the respective blades 34 as shown in broken lines 42 in FIG. 4. The automatic tool path generator 50 may use the 3-D mathematical transformation matrix of the respective finished surfaces, the nominal CAD model of the respective surfaces of the integrally bladed rotor 30 (shown in solid lines 40 in FIG. 4), which is available in the N/C unit 48 and the nominal tool path designed for machining the nominal CAD model of the respective surfaces which is also available in the numerically controlled unit 48, as calculation inputs to generate a new created tool path program. The new created tool path program may include tool path transitions smoothly merging from the nominal disk 32 CAD model of the respective surfaces to the 3-D mathematical transformation matrix of the respective finished surfaces of the blade 34. The milling cutter 38 used in the milling machine 46, performs the flank and/or point milling operation on each finished surface of the respective blades 34 of the integrally bladed rotor 30 in accordance with the new created tool path program, which generates new finished surfaces of the respective blades 34 of the integrally bladed rotor 30, with optimized material removal, minimizing mismatch and increased quality of the product.

The blades of the integrally bladed rotor 30 are a twisting and curved configuration, resulting in a complicated geometry of the surfaces thereof. In a flank and/or point milling operation to machine these surfaces, the milling cutter 38 is continuously moving on the respective blades 34, not only changing positions but also orientations thereof in order to generate the complicated geometry of the surfaces. It should also be noted that the space between adjacent blades 34 is limited. Therefore, the geometry of the milling cutter is taken into consideration when the nominal tool paths are designed, in order to ensure that the designed nominal tool paths prevent the milling cutter 38 from interfering with adjacent blades as the milling cutter 38 changes orientation and position during the milling operation.

The generated new created tool path program provides a new tool path which will differ from the nominal tool path and thus the positions and orientation of the milling cutter 38 in the new created tool path, may vary from those in the nominal tool path. Therefore, the new created tool path program must be validated to ensure that it is performable in practice. For this purpose the new created tool path program has taken into consideration the positions and orientations of the of the milling cutter 38 having the selected geometry, in order to prevent the milling cutter 38 from interfering with the blades adjacent the blade being currently machined, while following the new created tool path.

The automatic tool path generator 50 according to one embodiment associates the nominal tool paths with the nominal CAD model of the respective surfaces of the integrally bladed rotor 30 in order to establish a start point for calculation of the new created tool path program, for example by calculating the best fit with 6 degrees of liberty of the nominal tool paths within the respective finished surfaces of the integrally bladed rotor 30. The automatic tool path generator 50 according to one embodiment, may provide the best fit of the 3-D mathematical transformation matrix of each finished surface of the integrally bladed rotor 30 independently with the corresponding nominal surface in the nominal CAD model of the integrally bladed rotor 30 and then may use the 3-D mathematical transformation matrix of each finished surface to achieve minimum deviations between the nominal tool paths and the 3-D mathematical transformation matrix of each finished surface.

Upon completion of the data inputs as described above, the automatic tool path generator 50 can begin to generate the new created tool path program to provide new tool paths for this machining operation. The generation of the new created tool path program which is to be stored in the N/C unit 48 which will control the milling machine 46, with the milling cutter 38, and all machining parameters. The new created tool path program may be identical to the nominal tool path program for a small disc portion and then it may be slowly transformed by the mathematical transformation matrix and may be completely different from the nominal tool path at the end to smoothly finish the machining operation of each surface.

Generation of the new created tool paths or the new created tool path program may be performed off-line such that the machining operation may begin after completion of generation of the new created tool paths. The milling cutter 38 of the milling machine 46 is manipulated in the milling operation in accordance with the new created tool paths which are stored in the N/C unit 48 of the machine tool 44, thereby generating new finished surfaces of the respective blades 34 of the integrally bladed rotor 30.

In accordance with another embodiment, generation of the N/C tool paths and machining of the area of the integrally bladed rotor in accordance with the generated N/C new tool path, may be concurrently conducted by sequentially generating and executing the succession of new movements of the milling cutter 38, whereby a succeeding move command is generated by the automatic tool path generator 50 prior to completion of the execution of a preceding new move command by the milling cutter 38 of the milling machine 46 controlled by the N/C unit 48.

The new created tool path program or the N/C new created tool paths, include position adjustments of the milling cutter 38 at various machining locations of the integrally bladed rotor 30 with respect to positions of the milling cutter 38 at corresponding locations, which may deviated slightly from the machining locations due to positioning adjustments in the N/C nominal tool path, in order to achieve smooth transitions between the nominal profile 40 and the finished profile 42 of the blade 34. The N/C new created tool path or the new created tool path program, may also include orientation adjustments of the milling cutter 38 at various machining locations with respect to orientations of the milling cutter 38 at corresponding locations of the N/C nominal tool path, in order to prevent the milling cutter 38 from interfering with the adjacent blades.

Alternatively, generation of the N/C new created tool path may also be conducted taking into consideration deflection of the milling cutter 38 effected by the cutting forces in a machining operation, particularly in a flank and/or point milling operation in which the milling cutter 38 is relatively long compared to the diameter thereof. However, tool path compensation for tool deflection is not part of the subject matter of this application and will not be further described herein.

The above description is meant to be exemplary only, and one skilled in the art will recognize that changes may be made to the embodiments described without departure from the scope of the described subject matter. For example, the machining method in the described embodiments is applied to an integrally bladed rotor which has the respective blades attached to the disc by a joining process. However, the machining method described above may also be applicable to an integrally bladed rotor which is directly machined from a block. The described machining method may be used in a final finishing step of the integrally bladed rotor regardless of the preceding fabrication steps thereof. Still other modifications which fall within the scope of the described subject matter will be apparent to those skilled in the art, in light of a review of this disclosure, and such modifications are intended to fall within the appended claims.

The invention claimed is:

1. A method of milling an integrally bladed rotor having a plurality of blades radially extending from a disc, the method comprising:
   a) measuring the integrally bladed rotor in a 3-D scanning process and obtaining a 3-D mathematical transformation matrix of each finished surface of the integrally bladed rotor;
   b) using the 3-D mathematical transformation matrix of the respective finished surfaces, a nominal computer aided design (CAD) model of respective surfaces of the integrally bladed rotor and nominal tool paths designed for the nominal CAD model of the respective surfaces, as calculation inputs to generate a new created tool path program, the new created tool path program including tool path transitions smoothly merging from the nominal CAD model of the respective surfaces to the 3-D mathematical transformation matrix of the respective finished surfaces, and the new created tool path program being defined taking into consideration, positions and orientations of a milling cutter having a selected geometry when controlled by the new created tool path program in a flank and point milling operation in order to prevent the milling cutter from interfering with blades adjacent a blade being currently machined; and
   c) milling the integrally bladed rotor by using the milling cutter according to the new created tool path program in order to generate new finished surfaces of the integrally bladed rotor.

2. The method as defined in claim 1 wherein step (b) further comprises establishing a start point for calculation of the new created tool path program, by calculating the best fit with 6 degrees of liberty of the nominal tool paths within the respective finished surfaces of the integrally bladed rotor.

3. The method as defined in claim 1 wherein step (b) comprises providing the best fit of the 3-D mathematical transformation matrix of each finished surface of the integrally bladed rotor independently with the corresponding nominal surface in the nominal CAD model of the integrally bladed rotor to achieve minimum deviations between the nominal tool paths and the 3-D mathematical transformation matrix of each finished surface.

4. The method as defined in claim 1 wherein the new created tool path program comprises position adjustment of the milling cutter at various machining locations of the integrally bladed rotor with respect to positions of the milling cutter at corresponding locations in the nominal tool paths.

5. The method as defined in claim 4 wherein the new created tool path program comprises orientation adjustment of the milling cutter at said locations with respect to orientations of the milling cutter at corresponding locations in the nominal tool paths, in order to prevent the milling cutter from interfering with the adjacent blades.

6. The method as defined in claim 1 wherein the finished surface of the integrally bladed rotor comprises a suction side surface, pressure side surface, leading edge surface, trailing edge surface or root surface of each of the blades of the integrally bladed rotor.

7. The method as defined in claim 1 wherein the finished surface of the integrally bladed rotor comprises a machined surface or a forged surface.

8. The method as defined in claim 1 comprising concurrently generating the new created tool path program in a controller of a numerically controlled (N/C) machine tool in which the nominal tool paths are stored and milling an area of the integrally bladed rotor with the machine tool according to the new created tool path program, by sequentially generating and executing a succession of new move commands which replace a corresponding succession of nominal move commands of the nominal tool paths for this area.

9. A method of milling an integrally bladed rotor having a plurality of blades radially extending from a disc, the method comprising:
   a) measuring the integrally bladed rotor in a 3-D scanning process and obtaining a 3-D mathematical transformation matrix of each finished surface of the integrally bladed rotor;
   b) providing the best fit of the 3-D mathematical transformation matrix of each finished surface independently on a nominal computer aided design (CAD) model of the integrally bladed rotor;
   c) using numerically controlled (N/C) nominal tool paths with the 3 D mathematical transformation matrix of each finished surface to achieve minimum deviations between the N/C nominal tool paths and the 3 D mathematical transformation matrix of each finished surface; and
   d) generating N/C new created tool paths by gradually modifying the N/C nominal tool paths and milling an area of the integrally bladed rotor in accordance with the generated N/C new created tool paths, wherein the generated N/C new created tool paths include a smooth transition merging from the nominal CAD model to the 3-D mathematical transformation matrix of each finished surface, and wherein the new created tool paths prevent a milling cutter currently milling the area in accordance with the new created tool paths, from interfering with a blade spaced from and adjacent to the area.

10. The method as defined in claim 9 wherein the N/C new created tool paths comprise position adjustments of the milling cutter at various milling locations of the integrally bladed rotor with respect to positions of the milling cutter at corresponding locations in the N/C nominal tool paths.

11. The method as defined in claim 9 wherein the N/C new created tool paths comprise orientation adjustments of the milling cutter at various milling locations with respect to orientations of the milling cutter at corresponding locations in the N/C nominal tool paths, in order to prevent the milling cutter from interfering with the adjacent blade.

12. The method as defined in claim 9 wherein the generation of the N/C new created tool paths and the milling of the area of the integrally bladed rotor in accordance with the generated N/C new created tool paths, are concurrently conducted by sequentially generating and executing the succession of the modified move commands.

* * * * *